Aug. 6, 1935.  A. O. JAEGER  2,010,235
CATALYTIC OXIDATION OF AMMONIA
Filed Feb. 25, 1928  5 Sheets-Sheet 1
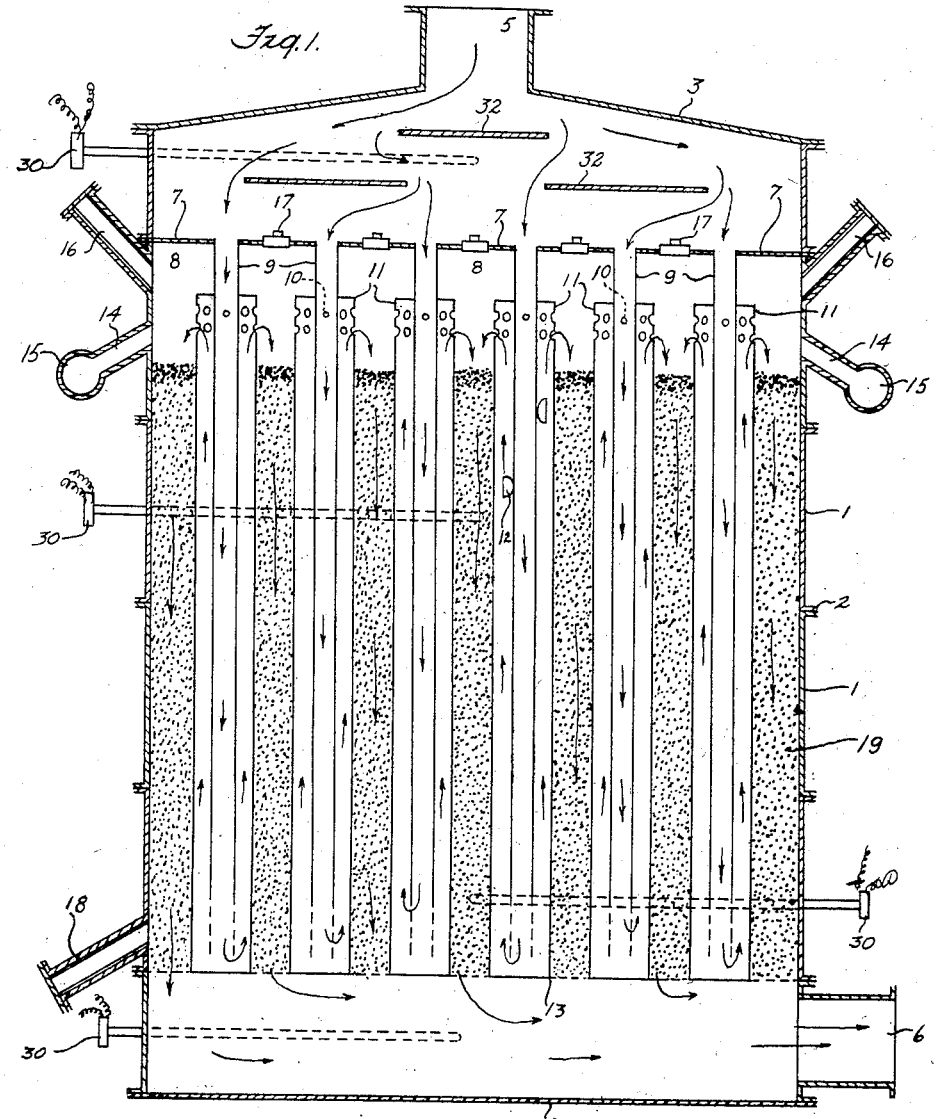
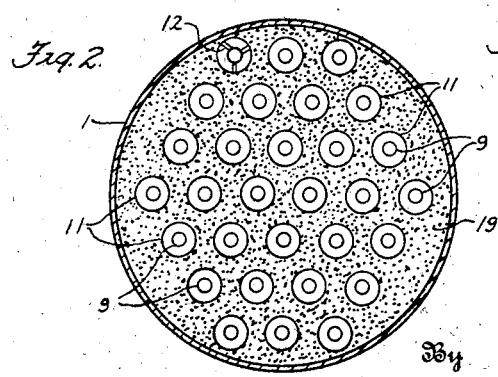
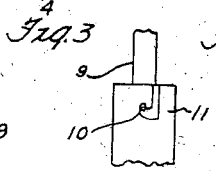
Inventor
Alphons O. Jaeger
By Robert Ames Norton
Attorney Aug. 6, 1935.  A. O. JAEGER  2,010,235

CATALYTIC OXIDATION OF AMMONIA

Filed Feb. 25, 1928  5 Sheets-Sheet 2

Inventor
Alphons O. Jaeger

By Robert Ames Norton

Attorney

Aug. 6, 1935.      A. O. JAEGER      2,010,235
CATALYTIC OXIDATION OF AMMONIA
Filed Feb. 25, 1928      5 Sheets-Sheet 3
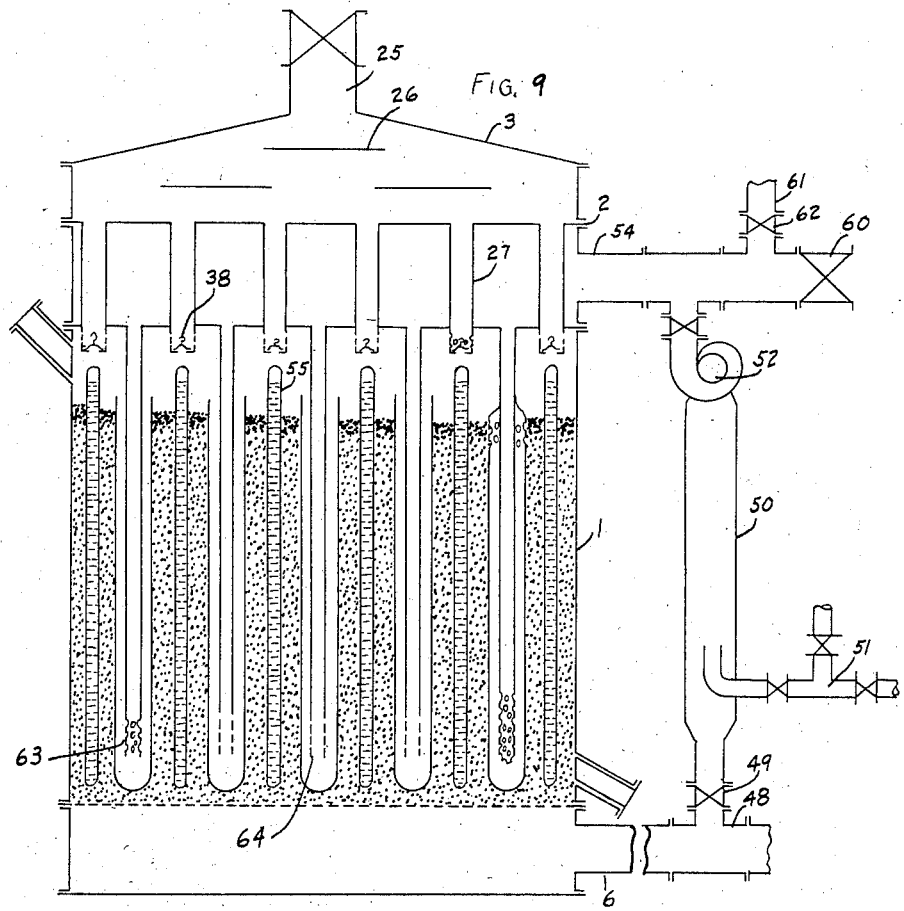
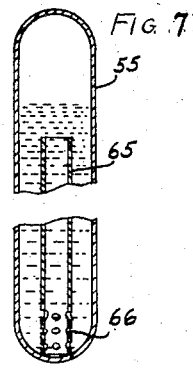
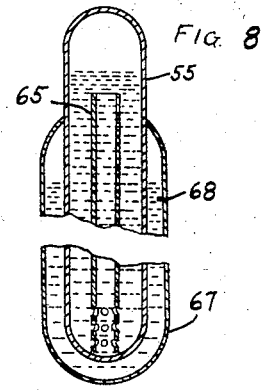
Inventor
Alphons O. Jaeger
By Robert Ames Norton
Attorney Aug. 6, 1935.  A. O. JAEGER  2,010,235
CATALYTIC OXIDATION OF AMMONIA
Filed Feb. 25, 1923  5 Sheets-Sheet 5

Inventor
Alphons O Jaeger
By Robert Ames Norton
Attorney

Patented Aug. 6, 1935

2,010,235

UNITED STATES PATENT OFFICE 2,010,235

CATALYTIC OXIDATION OF AMMONIA

Alphons O. Jaeger, Crafton, Pa., assignor, by mesne assignments, to American Cyanamid & Chemical Corporation, a corporation of Delaware Application February 25, 1928, Serial No. 256,918

3 Claims. (Cl. 23—162)

This invention relates to the catalytic oxidation of ammonia to oxides of nitrogen.

In the past ammonia has been oxidized to oxides of nitrogen in rather crude apparatus, usually consisting of series of platinum gauzes in a crude converter which does not permit accurate temperature control. While the ranges of temperatures throughout which the reaction can be carried out is considerably greater than in many of the more delicate and sensitive catalytic reactions, such as the oxidation of organic compounds to intermediate compounds, and the like, it is nevertheless very desirable to maintain a uniform temperature at a predetermined figure so as to assure high yields and uniform production. This is particularly important when the oxidation of ammonia is carried out in combination with the method of forming concentrated nitric acid from the oxides of nitrogen produced in the reaction, as will be referred to further on.

According to the present invention the oxidation of ammonia is carried out by causing reaction gases to flow in double counter current heat exchange elements in a converter, the first flow being in indirect heat exchange relation with the catalyst, that is to say, heat exchange relation through an intermediate moving gas stream instead of stationary wall, the gas flow being then reversed and passed in direct heat exchanging relation with the contact mass and with the incoming gases on their first flow, and finally, after a second reversal, the gases are permitted to flow directly through the contact mass. The double counter current flow permits gradually heating the reaction gases up to reaction temperature and at the same time is so effective a heat exchange as to control the reaction temperature in a most satisfactory manner. Owing to the tremendously effective heat exchange, the cooling capacity will vary directly with the amount of reaction gases passed through the converter, and since the heat evolved in the reaction throughout wide ranges is also directly proportional to the amount of reaction gases flowing through, it will be readily apparent that the temperature regulation will be substantially uniform. The automatic control throughout wide variations of catalyst loading and reaction gas speed is a most desirable feature, since in making installations, particularly smaller installations, the process receives the most fragmentary supervision, frequently by relatively unskilled men so that an automatic control of temperature, which is the salient feature of the present invention, is of tremendous importance and makes for as nearly fool-proof a system as can be constructed. Moreover, the reaction can be definitely controlled, and kept in control in a simple and elegant manner, without the use of any complicated apparatus.

The principles of double counter current reaction gas flow can of course be embodied in many types of apparatus, a number of representative types being shown in the drawings.

The oxidation of ammonia presents a reaction in which the reaction product is comparatively stable, and this makes it feasible to recirculate part of the reaction gases, a feature which can be most effectively combined with the double counter current heat exchange of the present invention and which increases the capacity and effectiveness of the automatic temperature control. Various modifications of recirculation are shown in the drawings and included within the scope of the invention.

This invention is not concerned with the use of any particular catalyst or contact mass, nor is it broadly concerned with any particular reaction temperature or range of reaction temperatures the features of the invention consisting in the accurate control of a predetermined range. The best catalyst to use, and the optimum temperature for each contact mass, will be determined in accordance with the best practice, as shown by the literature.

The primary features of the present invention, with the uniform temperature control and heat economy which characterizes them, may be used with any desired type of absorption system for the production of nitric acid. The process of the present invention may also be used with a novel method of nitric acid concentration. In ordinary practice nitrogen oxides are absorbed in water to form a dilute nitric acid, which is then mixed with sulfuric acid of suitable strength and passed down to a concentrating tower in counter current to steam. Strong nitric acid is distilled off and a dilute sulfuric acid flows out of the bottom tower, where it may be subjected to denitrification in order to recover the last trace of nitric acid contained. The process of the present invention may be used in conjunction with processes in which the use of steam is partly or wholly dispensed with; thus the oxides of nitrogen may be absorbed in water and after mixing with sulfuric acid, be passed in counter current with sulfur trioxide gases from a contact plant, the heat being sufficient in many cases to permit the complete omission of steam, and results not only in concentrated nitric acid but also in a concentrated sulfuric acid, a very important economy.

The temperatures used in the oxidation of ammonia are very high, and range frequently from 500 to 700° C., or even higher. This sets up serious strains in many types of converters, and it is an advantage of the present invention that a simple converter, requiring no internal gas-tight joints, can be used. Differential stresses are set up by the high temperatures used, but do not tend to cause leaking joints such as may readily occur in converters of the type used in the past, and this applicability to the high temperature reactions is an additional advantage of the present invention.

The accurate temperature control features of the present invention are, of course, effective with any type of catalyst but are particularly advantageous when non-platinum catalysts are used with which the time of contact is much longer than with platinum and the necessity for accurate temperature control is correspondingly greater.

The invention will be described in greater detail in connection with the drawings in which Fig. 1 is a vertical cross section through a converter showing the automatic gas cooling feature of the present invention;

Fig. 2 is a horizontal cross section through Fig. 1;

Figs. 3 and 4 are details of the method of attaching the double counter current heat exchange elements;

Figs. 7 and 8 are details of the heat equalizing means shown in Figs. 9 and 10;

Fig. 9 is a vertical section through a converter showing recirculating and temperature equalizing means;

Figure 5:
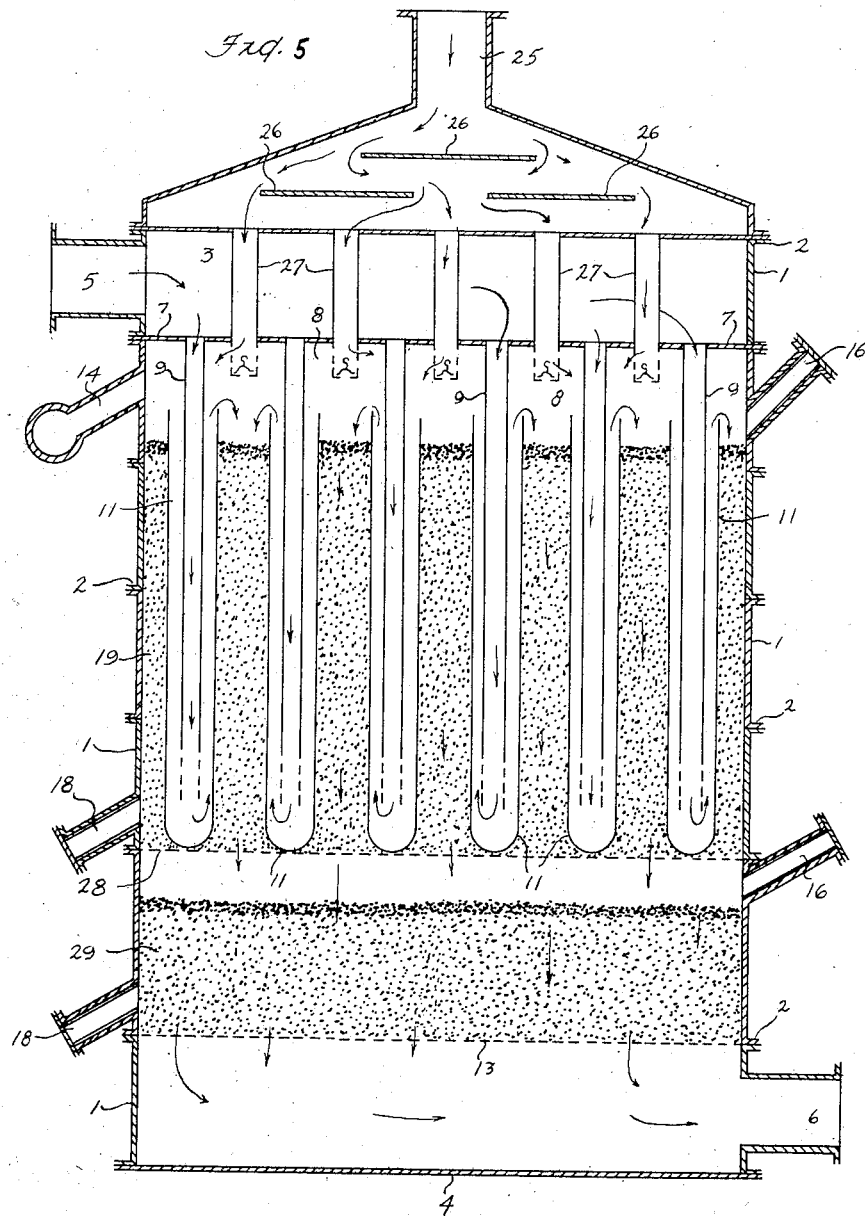
Fig. 5 is a vertical section through a modified converter provided with auxiliary gas introducing means and with an uncooled catalyst layer.

In the drawings in Fig. 1 the catalyst is shown in granular form but is conventionally shown by stippling in the remaining figures. It should be understood that the representation of the catalyst is only a conventional representation and the invention is not in any sense limited to the use of particular types or shapes of catalysts.

The converter shown on Fig. 1 consists of an outer shell formed of rings 1 provided with flanges 2 and connected to a top piece 3 and bottom piece 4. The reaction gases enter the top piece through the pipe 5, are distributed by means of the baffles 32 and thence pass down through the central cooling tubes 9 and then up in the outer cooling tubes 11 in the opposite direction. The tubes 11 are attached to the inner tubes 9 by any suitable fastening such as a bayonet fastening illustrated in Figs. 3 and 4, the pin 10 entering into the bayonet slot in the tube 11. Other fastenings such as short chains, hooks and the like may also be employed. The inner cooling tubes 9 are, of course, firmly mounted in the top plate 7 and the alignment of tubes 9 and 11 may be preserved by spacing lugs 12.

The gases after passing up through the tubes 11 emerge through perforations at the top of the tubes into the upper gas space 8 and thence down through the catalyst 19. The catalyst is retained by the sieve or perforated bottom 13 through which the reacted gases pass into the lower space of the converter and thence out through the exhaust pipe 6.

Catalyst can be introduced either through the side openings 16 or through the openings in the plate 7 which are closed by the plugs 17. Catalyst can be removed through the outlet 18. The pipes 16 and 18 may, if desired, be filled with suitable inert material. Temperatures at various points are measured by the thermometric elements 30 which are illustrated in the form of electric pyrometers, but may, of course, be of any other suitable type. Where additional cooling gases are desired at the surface of the catalyst where the most violent reaction takes place, these gases may be introduced through the pipes 14 from the collector pipe 15.

In operation, the cold or cooled gases entering first pass down through the tubes 9 in indirect heat exchanging contact with the catalyst but in direct heat exchanging relation with the ascending gases in tubes 11. The gases are thus gradually warmed up and after emerging from the open end of tubes 9, they rise in tubes 11 in direct heat exchanging relation with the catalyst and in counterflow to the flow of gases through the catalyst. In the case of exothermic reactions, the catalyst is very hot and the gases in ascending the tubes 11 are rapidly and progressively heated, the rise in temperature being somewhat moderated by the cooling action of the down flowing gases in tubes 9 so that the gases emerging from the top of tubes 11 are not at an excessively high temperature. The heated reaction gases, with or without further addition of cool or cold gases through the pipes 14, then pass through the catalyst where the reaction takes place. The catalyst, however, does not become overheated as it is in intimate heat exchanging relation with the tubes and is cooled by the incoming gases. Too violent reaction in the upper zones of the catalyst is effectively prevented by the fact that the gases contacting with the upper layers of the catalyst are partly cooled by the gases in the tubes 9 and may be mixed with a suitable amount of cold or cooler gases through the pipes 14.

It will be seen that the converter heats up in a steady, regular manner the incoming cold gases and at the same time the catalyst itself is cooled. All of the heat of the catalyst or substantially all is thus utilized for heating the incoming gases and the manner of flow permits a very even cooling action while at the same time, the provision of the pipes 14 makes it possible to control sudden increases in temperature in the upper catalyst zones by a sudden and large increase in the inflow of cold or cooler gases. Where the reaction does not produce excessive heat per unit of reacting gases or where sudden overheating of the catalyst is not to be feared, the auxiliary cool gas pipes 14 may be dispensed with.

The heat evolved throughout the catalyst is, of course, by no means uniform since by far the greatest percentage of reaction and correspondingly of heat evolution takes place in the first catalyst layers and a rather steep temperature gradient may therefore, exist in the catalytic layers from the top to the bottom. This temperature gradient is effectively utilized by causing the cold gases emerging from the bottom of the tubes 9 to come into heat exchanging relation first with a portion of the catalyst which is at a relatively low temperature and then as they are heated up and as they rise in the tubes 11, the gases come into contact with progressively hotter and hotter catalyst so that at all times, the gases are subjected to a temperature differential sufficient to cause a large and steady flow of heat from the catalyst to the gases. At the same time, the excessive temperatures which might otherwise be produced in the upper catalyst layers are to some extent moderated by the fact that the rising gases not only absorb heat from the catalyst, but also give off a certain increasing amount of heat to the incoming cold gases in the tubes 9.

An example of a well known catalyst which may be used in the converters shown in Figs. 1 to 4 is prepared by dissolving 50 parts of pure iron nitrate and 2-3 parts of pure bismuth nitrate in pure nitric acid followed by precipitation with ammonia, drying, and forming into suitable fragments. Ammonia together with an excess of oxygen in the form of air is passed over the contact mass at about 700° C. and excellent yields of nitrogen oxides are obtained.

Figure 6:
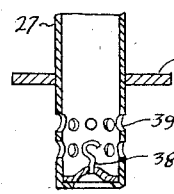
Fig. 6 is a detail of the gas distributers shown in Fig. 5.

In the construction of Figs. 5 and 6 the double counter current heat exchange cooling is supplemented by means for direct introduction of gases into the contact mass without passing through the heat exchange elements. Similar structures bear the same reference numerals as in Fig. 1.

In addition to the perforated partition 7 a further perforated partition is provided above the former from which pipes 27 pass down through the partition 7 and are provided with removable baffle plates 38 and perforations 39. Gases are introduced through the pipe 5 into the space between the two and flow through the counter current heat exchange elements as in the structure shown in Fig. 1. Auxiliary gases which may consist either in a mixture of ammonia and air or of one or the other alone may be introduced into the top of the converter through pipe 25 and after mixing by means of the baffle plates 26 flow directly down through the pipes 27. This auxiliary gas introduction may be used continuously or as an emergency measure to reduce excessive temperatures should the latter obtain for any reason.

In addition to auxiliary gas introduction the converter is provided with an uncooled catalyst layer supported by a screen 13 below the layer cooled with automatic heat exchange devices. This additional layer serves to clean up any unreacted gases which may pass through the cooled layer. The converter may be operated in connection with the catalyst described in Figs. 1 to 4.

The converter shown in Fig. 5 may also be used for a combined reaction in which ammonia from coal tar is purified by burning out organic constituents and then transformed into oxides of nitrogen. In this case the cooled layer or upper portion of it may consist in a contact mass for the catalytic combustion of organic materials which may be prepared as follows:

36 parts of $V_2O_5$ are dissolved in 33.6 parts of 100% KOH in 900 volumes of water and to this solution 290 parts of kieselguhr are added. A solution containing 52.8 parts of ferric sulfate is added to the suspension with vigorous agitation in order to precipitate iron vanadate uniformly throughout the kieselguhr. The reaction mixture after freeing from the mother liquor is suspended in a potassium aluminate solution which has been prepared by the treatment of 88.8 parts of aluminum sulfate plus 18 $H_2O$ with caustic potash, the solution containing 600 parts of water. The suspension is then treated with 123 parts of 33° Bé. of potassium waterglass and if necessary a part of the excess alkali is neutralized by normal sulfuric acid. A gelatinous mass is formed which is pressed and dried and constitutes a zeolite body in which iron vanadate and kieselguhr are embedded as diluents.

Crude coal tar ammonia is mixed with an excess of air and heated up in the heat exchange elements to 370° C. before passing through the catalyst. The organic impurities are burned out without substantially attacking the ammonia for the contact mass is specifically toned to effect selective combustion of organic materials at the temperature used. The heated gases then pass through a layer of catalyst for the oxidation of ammonia to oxides of nitrogen which may be of any desired type, for example, one described in connection with Fig. 1. This combined process effectively utilizes unpurified ammonia obtained from coal tar and transforms the undesirable impurities into harmless products, mostly carbon dioxide, water and nitrogen which do not in any way adversely affect the subsequent oxidation of ammonia.

Fig. 9 illustrates a converter of the general type shown in Fig. 5 but provided with means for recirculating part of the gases and with temperature equalizing means. Similar parts bear the same reference numerals as in Fig. 5. The heat exchange elements are shown with slight modification, such as the provision of perforations or slots 63 and 64 in the bottom of some of the inner tubes of the double counter current heat exchange elements to force the gases to leave the tube over a larger area and thus prevent a blast of cold gas striking the bottom of the outer tubes and unduly cooling the immediately adjacent portion of the contact mass. It may also be desirable to close the upper ends of the outside tubes of the heat exchange elements as shown in the extreme right-hand element in the figure. This also aids in causing the gases to enter the catalyst over a larger area. Part of the exhaust gases leaving through the pipe 6 flow through a branch pipe 48 controlled by a valve 49 into a mixing chamber 50 in which additional reaction components may be introduced if desired through the valved pipe 51. The gases then enter the blower 52 and are forced into the pipe 54 which leads to the portion of the converter between the two perforated partitions and the recirculated gases then with or without admixture of fresh gases then pass through the heat exchange elements. Additional fresh gases may be introduced directly through the pipe 54 by manipulation of valve 60 or may be introduced through the branch pipe 61 controlled by the valve 62. All of the fresh gases may be introduced through the pipe 25 or part may be introduced through the recirculating system. The recirculation increases the capacity of the heat exchange elements and as the same gas is used over several times is advantageous in producing a more uniform and a finer temperature control. The reaction products, the oxides of nitrogen, are relatively stable and are not attacked by the catalysts during recirculation. In order to enhance the uniformity of temperature control and particularly to aid in preventing steep temperature gradients the temperature equalizing elements 55 which may be metal rods or as shown compartments filled with liquids of high heat conductivity or which boil at about the reaction temperature serve to conduct heat from the hotter catalyst zones to the colder and aid in the temperature regulation.

More elaborate constructions of temperature equalizing means are shown in Figs. 7 and 8 and may be used wherever desirable. In Fig. 7 the compartment 55 is provided with a central tube 65 carrying perforations 66 at its lower end. A very markedly increased circulation of the liquid in the compartment is thereby effected. In Fig. 8 an element similar to that shown in Fig. 7 is provided with an external jacket 67 filled with a liquid 68. This is an effective construction where a boiling liquid is used in the compartment 55 as the jacket with its liquid, which is preferably non-boiling, serves to smooth out heat fluctuations and also permits the use of much smaller quantities of boiling liquid which is frequently more expensive than non-boiling liquids as it is usually necessary to use mercury alloys for this purpose. It will be clear, of course, that temperature equalizing elements of all kinds may be used in the converters of Figs. 1 to 5 as well as in converters provided with recirculation.

Figure 10:
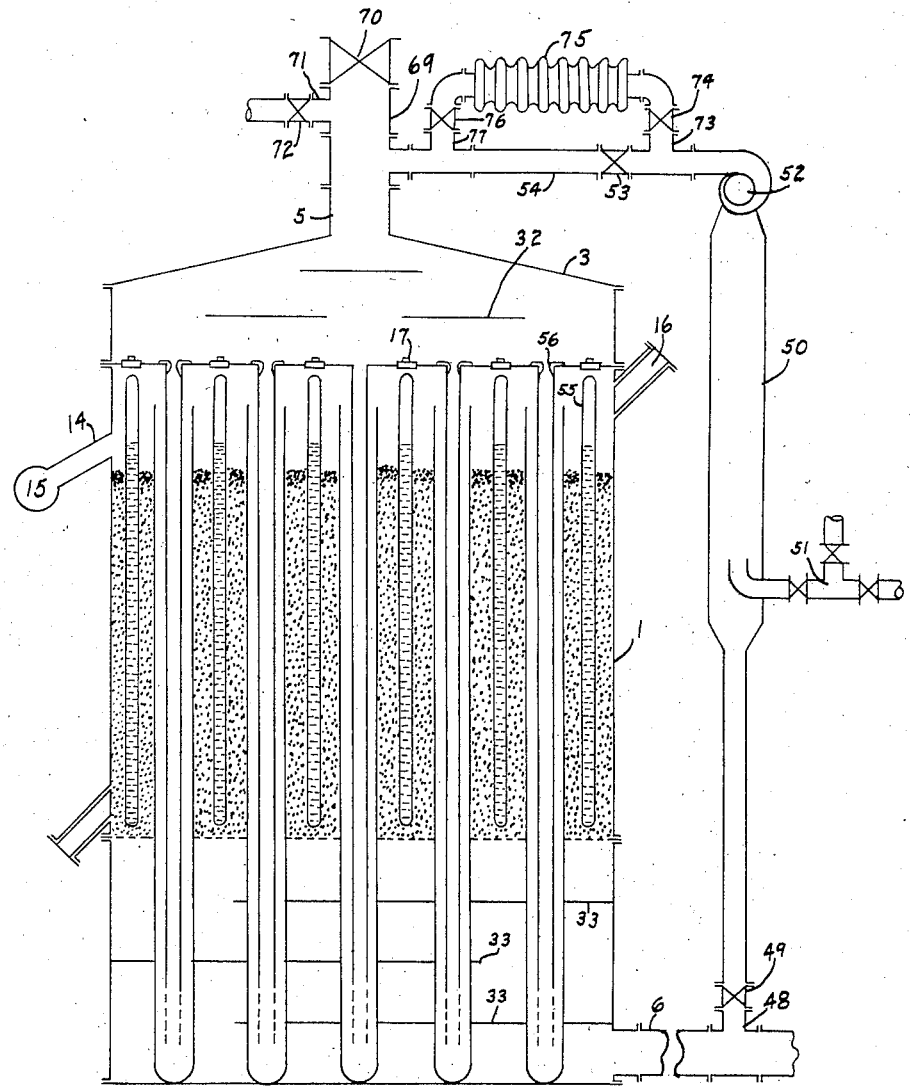
Fig. 10 is a vertical section through a converter showing recirculating means with an external cooler and an internal heat exchanger.

Fig. 10 illustrates a converter provided with recirculation. In this converter the double counter current heat exchange elements extend below the catalyst and the lower chamber of the converter is transformed into an internal heat exchanger by the baffles 33 which cause the reacted gases to pass over the extended heat exchange elements in a tortuous path. This permits a very effective utilization of the heat of reaction in pre-heating the entering ammonia-air mixture which makes it possible in many cases to dispense more or less with preheating from an external source.

The converter also shows another feature, namely, the provision of so-called orifice plugs 56. These plugs of varied apertures are mounted in the inner tubes of the heat exchangers so as to restrict the flow through the peripheral heat exchangers in comparison to the central heat exchangers thereby compensating for the peripheral cooling effect of the converter shell which in many cases is considerable in spite of thorough insulation. The drawings, of course, are purely diagrammatical and do not show such structural features as insulation and the like. The recirculated gases after entering the pipe 54 are provided with a cooling by-pass through the corrugated cooler 75 which connects to the pipe 54 through the pipes 73 and 77 controlled by the valves 74 and 76 and valve 53 is also provided in the pipe 54 intermediate between the points where the pipes 73 and 77 enter the latter. The recirculation is directly into the gas intake in pipe 5, the latter is shown as provided with a fresh gas control valve 70 and with a branch pipe 71 controlled by a valve 72 for auxiliary gas introduction. The construction in Fig. 10 permits a very desirable heat economy and accurate control of temperature as the amount of recirculation and the cooling taking place during recirculation can be controlled with great nicety with suitable adjustment of the valves as will be clear to a skilled engineer. It will be obvious, of course, that the various features shown may also be applied to other converters, thus, for example, the provision of cooling in the recirculating system may, of course, be applied to converters which do not have extended heat exchange elements and conversely converters which are not provided with recirculation may be constructed with heat exchange elements extending below the catalyst and will, of course, enjoy the benefits which accrue from this type of construction. In fact drawings are intended to illustrate a few embodiments of the principles of the process of the present invention which is not limited to the precise features set forth therein.

Figure 13:
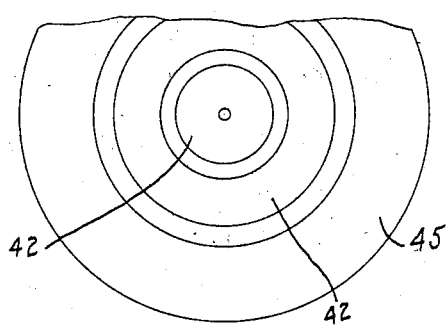
Figs. 12 and 13 are horizontal sections along the lines of 12—12 and 13—13 of Fig. 11.
Figure 12:
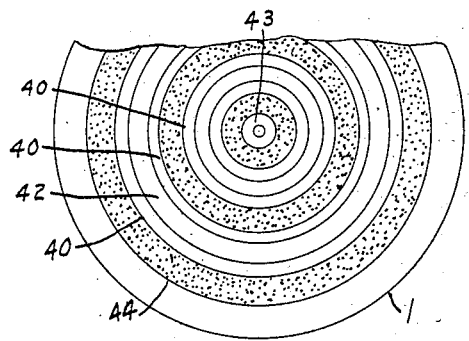
Figure 11:
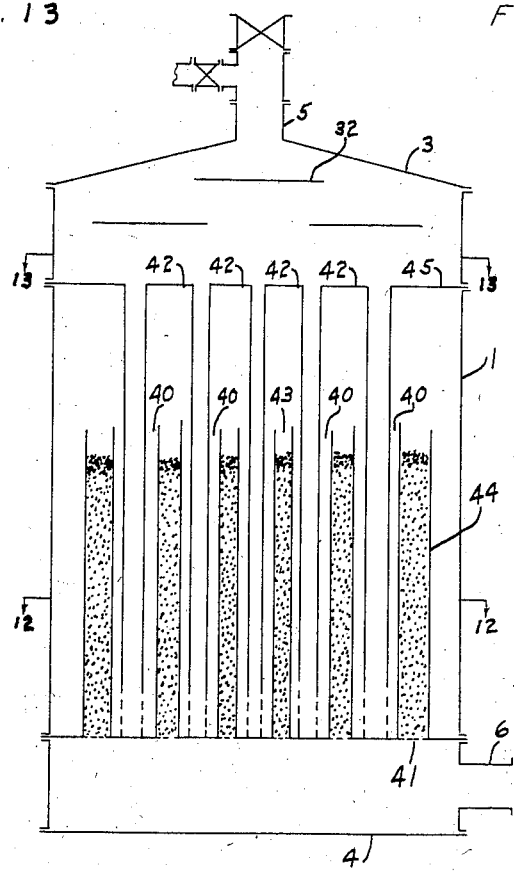
Fig. 11 is a vertical section through a converter having annular heat exchange elements.

Figs. 11 to 13 illustrate a type of converter in which the heat exchange elements are in the form of annuli. Instead of providing tubular double counter current heat exchange elements a similar effect is obtained by providing annuli with one end open and of different size arranged to fit into each other. Thus, shorter concentric annuli 40 are nested with their closed ends resting on a perforated bottom support 41 and larger annuli 42 are likewise nested with their open ends, which are preferably perforated, fitting into the open ends of annuli 40. It will be apparent, of course, that the center of the annuli 40 is taken up with an open end tube 43 and the outermost annuli, both long and short, are halved and utilize the converter shell 1, as one of their walls. These built-up annuli are numbered 44 and 45 respectively. The catalyst is placed between the annuli 40. While the converter structure is radically different from that shown in Fig. 1, an examination of the vertical cross section in Fig. 11 will make it apparent that the gas flow is the same, that is to say the incoming gases through the pipe 5 flow down the annular spaces between the annuli 42 reverse their flow and pass up between the walls of the annuli 42 and the annuli 40, or in the case of the central annulus 42 the gases pass down through the tube 43 reverse their flow and pass up through the annular space between this tube and the closed end tube 43. The first flow is in indirect heat exchanging relation with the catalyst and on reversal of flow the gases pass in direct heat exchanging relation with the catalyst and also with the incoming gases on the down flow and then on a second reversal the gases pass through the catalyst. In other words, in Fig. 11 instead of a series of circular automatic heat exchange elements with double counter flow all but one of the heat exchange elements are annular instead of circular.

This construction is very compact and as the surface presented by the heat exchange elements in relation to catalyst volume is higher than with tubular heat exchange elements somewhat finer control may be obtained and is advantageous. Striking though the difference may seem to be in the construction of the converter, it will be apparent from an examination of Fig. 11 that the reaction gas flow through the heat exchange elements is identical with that in the tubular heat exchange elements.

The catalyst annuli are shown narrower in the center than toward the periphery to compensate for the peripheral cooling effect of the converter shell. This produces a result similar to that obtained by the use of orifice plugs shown in Fig. 10. It will be clear that catalyst annuli of uniform thickness may be used where the peripheral cooling effect is not sufficiently great to make it worth while to compensate for it. Obviously, of course, orifice plates may be used in a similar way as in Fig. 10, such orifice plates, for example, being in the form of perforated covering plates over the spaces between the annuli 42 and provided with larger or more numerous openings in the central spaces than in the peripheral spaces. Any other suitable structural features may, of course, be used. It will also be clear that recirculation with or without temperature equalizing bodies may be applied to the converter shown in Figs. 11 to 13 with precisely the same effect as with the converters shown in Figs. 9 and 10.

What is claimed as new is:

1. A method of catalytically oxidizing ammonia to oxides of nitrogen which comprises passing ammonia admixed with oxygen containing gas through heat exchange elements at least partly embedded in a catalyst layer of great depth in direction of gas flow, the depth being of an entirely different order of magnitude than the thickness of standard platinum gauze catalysts, the gas being in indirect heat exchange relation with the catalyst, reversing the flow of gas and causing it to be in direct heating exchange relation with the catalyst and with the incoming gas during reverse flow, again reversing the gas flow and causing it to pass through the catalyst layer and causing an additional amount of ammonia and oxygen containing gas to pass directly through the catalyst without passing through the heat exchange elements embedded therein.

2. A method of catalytically oxidizing ammonia to oxides of nitrogen which comprises passing ammonia admixed with oxygen containing gas through heat exchange elements at least partly embedded in a catalyst layer of great depth in direction of gas flow, the depth being of an entirely different order of magnitude than the thickness of standard platinum gauze catalysts, the gas being in indirect heat exchange relation with the catalyst, reversing the flow of gas and causing it to be in direct heating exchange relation with the catalyst and with the incoming gas during reverse flow, again reversing the gas flow and causing it to pass through the catalyst layer, the catalyst temperature being equalized by temperature equalizing elements of high heat conductivity embedded therein.

3. A method of producing oxides of nitrogen from ammonia recovered from the distillation of coal and containing organic impurities, which comprises mixing the coal tar ammonia with oxygen containing gas, passing the mixture through heat exchanging elements at least partly embedded in a catalyst layer, the gas being in indirect heat exchanging relation with the catalyst, reversing the flow of gas and causing it to be in direct heat exchanging relation with the catalyst and with incoming gas during the reverse flow, again reversing the direction of gas flow and causing it to pass through a portion of the catalyst layer favoring the combustion of organic material but having substantially no activity for the oxidation of ammonia at the temperature used and causing the partly reacted gases to flow through a contact mass favoring the oxidation of ammonia to oxides of nitrogen.

ALPHONS O. JAEGER.